No. 609,168. Patented Aug. 16, 1898.
F. W. ROE.
VERMIN TRAP.
(Application filed Feb. 16, 1898.)
(No Model.)
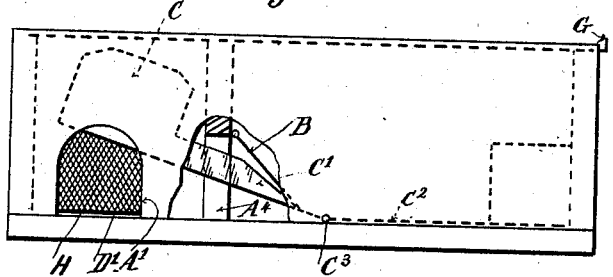
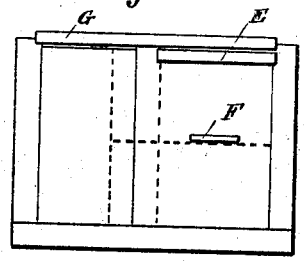
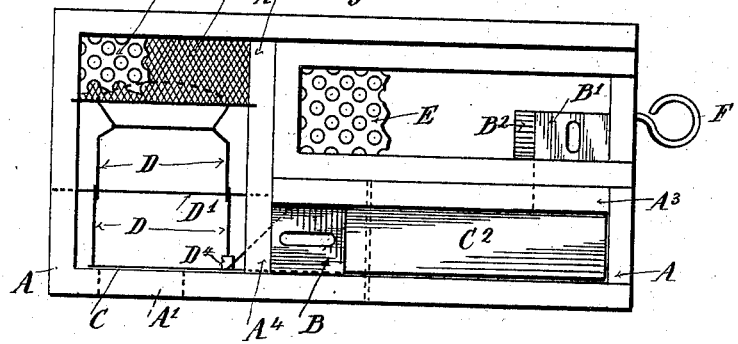
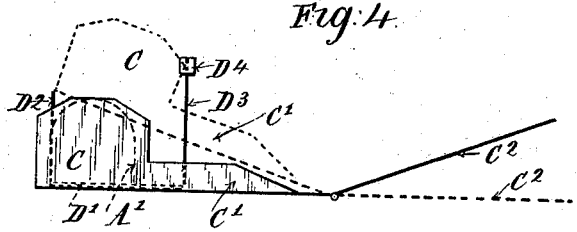
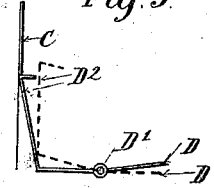
WITNESSES
INVENTOR
Frederick William Roe
by Richards & Co.
ATTYS.

United States Patent Office.

FREDERICK WILLIAM ROE, OF STONEHENGE, TASMANIA.

VERMIN-TRAP.

SPECIFICATION forming part of Letters Patent No. 609,168, dated August 16, 1898.

Application filed February 16, 1898. Serial No. 670,491. (No model.)

*To all whom it may concern:*

Be it known that I, FREDERICK WILLIAM ROE, a subject of the Queen of Great Britain and Ireland, residing at Stonehenge, in the Colony of Tasmania, have invented certain new and useful Improvements in Vermin-Traps; and I do hereby declare the following to be a full, clear, and exact description of the invention, such as will enable others skilled in the art to which it appertains to make and use the same.

This invention relates to improvements in vermin-traps for rats, mice, and like vermin; and it has for its object to construct a simple, cheap, and effective device which shall not require resetting after the vermin have been caught.

The trap consists of two apartments situated one within the other, the inner compartment being of such dimensions as to leave a space on two sides thereof, within which are arranged the bait and the mechanism for closing the aperture by which admission is effected to the outer compartment, and which aperture is placed at the lower front corner of the outer compartment. In front of the opening is placed the bait, which may also be inclosed by wire-netting or perforated plate, and in front of it a pivoted frame of wire, so arranged that upon the rats or the like passing thereon the door of the outer compartment will descend, thus preventing the exit of the animal. Situated in the space between the inner and outer compartments, and to which access is obtained by passing through a door pivoted at the top and inclined vertically at an angle, so that return is impossible, is a plate of metal or any other material, which may be attached to or form part of the door, and which plate is pivoted at or near the center of its length and is shaped so that when the entrance to the outer compartment is closed the plate will be caused to incline at an angle to the base of the trap, the end being raised above the opening to the inner compartment, the entrance to which is also provided with a door operable in one direction only. Upon the rat or the like running along the inclined plane formed by the plate, the same will be depressed and the opening to the inner compartment disclosed. At the same time the wire aforesaid will engage with the plate covering or closing the main entrance, leaving the trap set ready for use.

In order that the invention may be better understood, I will proceed to describe the same, with reference to the drawings hereto appended, in which—

Figure 1 is a front side elevation. Fig. 2 is an end view. Fig. 3 is a plan showing general arrangement of trap. Fig. 4 is a view showing more clearly the construction and arrangement of the door of the outer compartment. Fig. 5 is a view showing the position of the retaining-wire for the door above referred to.

A are the walls of the outer compartment, which may be of any suitable formation, but preferably a rectangular oblong body, and which may be constructed of wood or wire-netting or perforated sheet metal or a combination of wood and any of the materials enumerated. An opening A' is provided and is arranged as shown in full, Fig. 1, and indicated in dotted lines, Fig. 3. The compartment is divided by means of partitions $A^2 A^3$, the partition $A^2$ having an opening $A^4$, formed as indicated in Fig. 1. The opening $A^4$ is covered by means of the swing-door B, which, as shown in the drawings, is arranged so as to allow of the free passage inward of the rat or the like, but which will effectually prevent the same returning. The opening in the partition $A^3$ is provided with a like door B', arranged in a similar manner, a fillet of wood or other material $B^2$ being placed at the side to prevent the door being raised from the side. To close the entrance A', a plate C is provided, which, as shown in Figs. 1, 3, and 4, consists of a vertical portion C, of any suitable shape, which is arranged against the side of the chamber on the inside and which is connected by the piece C' to the horizontal inclined plate $C^2$, which, as aforesaid, is placed between the partitions $A^2 A^3$, as shown in Fig. 3, and pivoted at $C^3$. The plate C is kept raised by means of the wire frame D, which, as shown, consists of a horizontal frame composed of wire and pivoted centrally upon the cross-piece D'. The forward end of the frame is provided with two upwardly-extending wires $D^2 D^3$, one of which is turned over at the top and when at rest is in the position indicated in Figs. 4 and 5, when the top or turned-over portion engages with the under side of the plate C until the wire is displaced, as indicated by dotted lines in Fig. 5, when the plate C is caused by gravity to descend, covering the aperture $A^3$, as indicated in Fig. 4. The other vertical wire $D^3$ is provided with a counterweight $D^4$ to return the frame to its position when the weight of the animal is removed from the frame.

The plate C is returned to its normal raised position by the animal, which, passing along the inclined piece $C^2$, causes the same to descend, raising the plate C, which is then retained by the wire $D^2$, as aforesaid.

At the rear of the outer chamber is a piece of wire-gauze or perforated metal sliding in grooves formed diagonally across the vertical partitions, and in which is placed the bait, the object being to protect the same so that it may serve for any number of settings.

The inner chamber formed by the partitions $A^2 A^3$ may in some cases consist of a separate movable compartment placed as shown in the drawings at Fig. 3 and provided with a door, as described, and having a movable top or cover of perforated metal E, the whole being capable of withdraw by means of the wire F.

G is the cover, which, as shown, consists of perforated sheet metal running in longitudinal grooves formed in the side and which may be so arranged that it may be withdrawn from either end when it is desired to obtain access to the interior of the trap.

The rat or the like having effected an entrance by the opening $A'$ will advance toward the bait in the receptacle H, and in doing so will tread upon the frame D, releasing the plate C, which will descend, closing the opening $A'$. The animal in its endeavor to escape will pass under the door B along the plate $C^2$, thereby depressing the same and raising the plate C, which, as aforesaid, will be supported by the end of the wire $D^2$. The animal seeing the opening to the inner chamber will pass therethrough, when the door closing behind it will prevent its return to the outer chamber.

Having now particularly described and ascertained the nature of my said invention and in what manner the same is to be performed, I declare that what I claim is—

1. In combination, the walls A having the partitions $A^2$ and $A^3$ forming the three compartments, the wire-gauze H in which the bait is placed, the plate C for closing the opening into the entrance-compartment, the plate $C^2$ connected to the said plate, the flap-door B, the third compartment alongside of the second and the flap-door $B'$ between them, substantially as described.

2. In combination, the walls A forming the box of the trap, the partitions $A^2 A^3$ therein and the door and flaps within the compartments, the said partitions $A^2 A^3$ forming the inner chamber, said chamber being removable, substantially as described.

In witness whereof I have hereunto set my hand, in presence of two witnesses, this 31st day of January, 1898.

FREDERICK WILLIAM ROE.

Witnesses:
JOHN H. JACK,
FRED C. HARRIS.